US009871843B2

(12) United States Patent
Liao (10) Patent No.: US 9,871,843 B2
(45) Date of Patent: Jan. 16, 2018

(54) METHOD AND SYSTEM FOR DOWNLOADING AND PLAYING MEDIA FILE, CLIENT, SERVER, AND STORAGE MEDIUM

(71) Applicant: Tencent Technology (Shenzhen) Company Limited, Shenzhen (CN)

(72) Inventor: Haizhen Liao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 264 days.

(21) Appl. No.: 14/736,122

(22) Filed: Jun. 10, 2015

(65) Prior Publication Data

US 2015/0281308 A1    Oct. 1, 2015

Related U.S. Application Data

(63) Continuation of application No. PCT/CN2013/084384, filed on Sep. 27, 2013.

(30) Foreign Application Priority Data

Dec. 13, 2012    (CN) .......................... 2012 1 0538686

(51) Int. Cl.
*G06F 15/16*    (2006.01)
*H04L 29/06*    (2006.01)
(Continued)

(52) U.S. Cl.
CPC .......... *H04L 65/604* (2013.01); *H04L 65/602* (2013.01); *H04L 65/607* (2013.01);
(Continued)

(58) Field of Classification Search
CPC ... H04L 65/602; H04L 65/604; H04L 65/607; H04L 29/06489; H04L 29/06496;
(Continued)

(56) References Cited

U.S. PATENT DOCUMENTS

2002/0156912 A1*  10/2002  Hurst ...................... H04L 29/06
                                                    709/236
2010/0169303 A1*   7/2010  Biderman .......... H04N 7/17318
                                                    707/723
(Continued)

FOREIGN PATENT DOCUMENTS

CN    1829309 A    9/2006
CN    101068336 A    11/2007
(Continued)

OTHER PUBLICATIONS

Tencent Technology, Written Opinion, PCT/CN2013/084384, Jan. 2, 2014, 11 pgs.

(Continued)

*Primary Examiner* — Liangche A Wang
*Assistant Examiner* — Johnny Aguiar
(74) *Attorney, Agent, or Firm* — Morgan, Lewis & Bockius LLP (57) ABSTRACT

The present disclosure relates to method and system for downloading and playing a media file, a client, a server, and a storage medium. The client is configured to initiate a request for acquiring a media file to the server, the request including current network connection information of the client, receive download list information from the server, the download list information identifying an ordered list of fragments extracted from the media file by the server in accordance with the current network connection information of the client, initiate a request for acquiring fragments of the media file to the server, acquire the fragments of the media (Continued)

file returned by the server, and play the fragments of the media file according to the order of the fragments when receiving an instruction of playing the media file. The present disclosure can simply and quickly play a media file that is not downloaded completely.

11 Claims, 3 Drawing Sheets

(51) Int. Cl.
    *H04N 21/2387* (2011.01)
    *H04N 21/262* (2011.01)
    *H04N 21/433* (2011.01)
    *H04N 21/845* (2011.01)
    *H04L 29/08* (2006.01)
    *H04N 21/482* (2011.01)

(52) U.S. Cl.
    CPC .............. *H04L 67/10* (2013.01); *H04L 67/42* (2013.01); *H04N 21/2387* (2013.01); *H04N 21/26258* (2013.01); *H04N 21/4331* (2013.01); *H04N 21/8456* (2013.01); *H04L 29/06489* (2013.01); *H04L 65/4076* (2013.01); *H04L 65/4084* (2013.01); *H04N 21/4825* (2013.01)

(58) Field of Classification Search
    CPC . H04L 29/0651; H04L 67/42; H04L 65/4084; H04L 65/4076; H04N 21/44209; H04N 21/44213; H04N 21/2402; H04N 21/2387; H04N 21/2343; H04N 21/26258; H04N 21/4825; H04N 21/8456
    USPC ......... 709/203, 217, 219.224, 231, 219, 224
    See application file for complete search history.

(56) References Cited

U.S. PATENT DOCUMENTS

| | | | |
|---|---|---|---|
| 2011/0314130 A1* | 12/2011 | Strasman | H04L 29/06 709/219 |
| 2011/0320287 A1 | 12/2011 | Holt et al. | |
| 2012/0297430 A1* | 11/2012 | Morgos | H04L 65/4084 725/88 |
| 2013/0246643 A1* | 9/2013 | Luby | H04N 21/23439 709/231 |
| 2014/0013376 A1* | 1/2014 | Xu | H04N 21/25 725/116 |
| 2014/0149557 A1* | 5/2014 | Lohmar | H04L 65/605 709/219 |
| 2014/0150046 A1* | 5/2014 | Epstein | H04N 21/23439 725/126 |
| 2014/0304377 A1* | 10/2014 | Andersson | H04L 65/1083 709/219 |

FOREIGN PATENT DOCUMENTS

| | | |
|---|---|---|
| CN | 101325720 A | 12/2008 |
| CN | 101997890 A | 3/2011 |
| WO | WO 2012009135 A1 | 1/2012 |

OTHER PUBLICATIONS

Tencent Technology, IPRP, PCT/CN2013/084384, Jun. 16, 2015, 6 pgs.
Tencent Technology, ISR, PCT/CN2013/084384, dated Jan. 2, 2014, 2 pgs.

* cited by examiner

METHOD AND SYSTEM FOR DOWNLOADING AND PLAYING MEDIA FILE, CLIENT, SERVER, AND STORAGE MEDIUM

RELATED APPLICATIONS

This patent application is a continuation application of PCT Patent Application No. PCT/CN2013/084384, entitled "METHOD AND SYSTEM FOR DOWNLOADING AND PLAYING MEDIA FILE, CLIENT, SERVER, AND STORAGE MEDIUM" filed on Sep. 27, 2013, which claims priority to Chinese Patent Application No. 201210538686.0, filed on Dec. 13, 2012, and entitled "METHOD AND SYSTEM FOR DOWNLOADING AND PLAYING MEDIA FILE", both of which are incorporated by reference in their entirety.

FIELD OF THE TECHNOLOGY

The present disclosure relates to the field of network information transmission technologies, and in particular, to a method and system for downloading and playing a media file, a client, a server, and a storage medium.

BACKGROUND OF THE DISCLOSURE

At present, with rapid development of network technologies, various media files such as digital music, video files are quite popular broadcast information on the Internet. These media files are generally stored in websites and broadcasted via a network, and therefore, a user needs to find a needed media file from a website and then directly download the media file if the user wants to download the needed media file locally, so as to facilitate appreciating play content of the media file locally.

However, in the downloading method, if the media file is not downloaded completely due to network reasons or other reasons, the media file that is not downloaded completely cannot be played locally. If the user wants to play the media file, the user needs to wait till the media file is downloaded completely, causing that user playback experiences of the media file are greatly lowered, and excellent feelings of the user during entertainment cannot be ensured.

SUMMARY

Therefore, the present disclosure provides method and system for downloading and playing a media file, a client, a server, and a storage medium, which can simply and quickly play a media file that is not downloaded completely.

Specifically, embodiments of the present application provide a method for downloading and playing a media file, running on a client and including the following steps: initiating a request for acquiring a media file to a server, the request including current network connection information of the client; receiving download list information from the server, wherein the download list information identifies an ordered list of fragments extracted from the media file by the server in accordance with the current network connection information of the client; initiating a request for acquiring the fragments of the media file to the server according to the order of the fragments in the download list information, and acquiring the fragments of the media file returned by the server; and playing the fragments of the media file returned by the server in accordance with the order of the fragments according to a received instruction of playing the media file.

The embodiments of the present application further provide a method for downloading and playing a media file, running on a server and including the following steps: receiving a request for acquiring a media file from a client, the request including current network connection information of the client; dividing the media file into an ordered list of fragments according to the current network connection information of the client, storing the fragments so as to form download list information of the fragments, and further sending the download list information of the fragments to the client; receiving a request for acquiring the fragments of the media file from the client; and returning the fragments of the media file to the client sequentially according to the order of the fragments in the download list information.

According to the method provided in the embodiments of the present application, the embodiments of the present application further provide a client including one or more processors; memory; and a plurality of program modules, wherein the plurality of program modules, when executed by the one or more processors, cause the client to perform predefined operations, the plurality of program modules further including:

a file acquiring module, configured to initiate a request for acquiring a media file to a server, the request including current network connection information of the client, and receive download list information from the server, wherein the download list information identifies an ordered list of fragments extracted from the media file by the server in accordance with the current network connection information of the client;

a fragment acquiring module, configured to initiate a request for acquiring the fragments of the media file to the server according to the order of the fragments in the download list information, and acquire the fragments of the media file returned by the server; and a playback module, configured to play the fragments of the media file returned by the server in accordance with the order of the fragments according to a received instruction of playing the media file.

It may be known from the foregoing descriptions that in the present disclosure, the server divides the media file into an ordered list of fragments according to the current network connection information of the client and stores the fragments so as to form the download list information of the fragments; and the client initiates a request for acquiring fragments of the media file to the server according to an order of the fragments in download list information, and plays the fragments of the media file according to the order of the fragments when receiving an instruction of playing the media file. Because an optimization downloading method of dividing the media file and a method of playing the fragments are used, the downloading method is optimized, the media file may also be played according to an order of the fragments. Even if when other fragments of the media file are not downloaded completely, the downloaded fragments may also be normally played. In this way, a user may play a part of the media file that is downloaded completely at any time, which achieves an objective of simply and quickly playing a media file that is not downloaded completely.

The foregoing description merely briefly describes the technical solution of the present disclosure, so as to understand the technical solution of the present disclosure more clearly, and implement the present disclosure according to the content of the specification. Moreover, to make the foregoing and other objectives, characteristics, and advantages of the present disclosure more comprehensible,

DESCRIPTION OF EMBODIMENTS

To further explain the technical means used in the present disclosure for achieving the intended objectives and the efficacy thereof, specific implementation manners, structures, features, and efficacy of a method and system for downloading and playing a media file, a client, a server, and a storage medium provided in the present disclosure are described in detail below with reference to the accompanying drawings and preferred embodiments.

The foregoing and other technical content, features, and efficacy of the present disclosure will be clearly presented in the detailed description of the preferred embodiments with reference to the drawings. Through the description of the specific implementation manners, the technical means used in the present disclosure for achieving the intended objectives and the efficacy can be understood more deeply and specifically. However, the accompanying drawings are just used for reference and description and not intended to limit the present disclosure.

Figure 1:
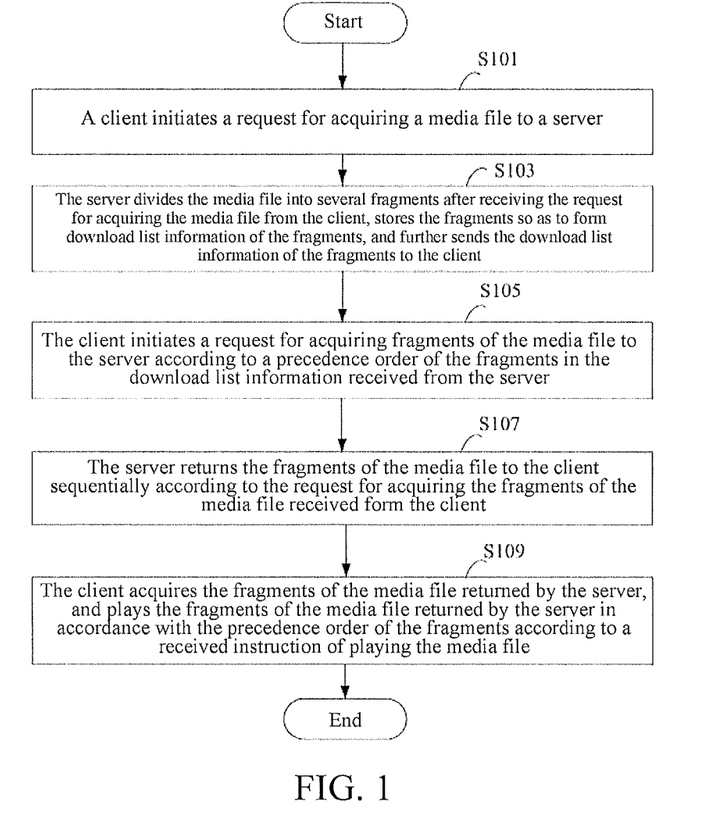
FIG. 1 is a flowchart of steps of a method for downloading and playing a media file according to an embodiment of the present application.

FIG. 1 is a flowchart of steps of a method for downloading and playing a media file according to an embodiment of the present application. Referring to FIG. 1, the method for downloading and playing a media file in this embodiment of the present application may include the following steps S101-S109:

Step S101: A client initiates a request for acquiring a media file to a server, the request including current network connection information of the client.

In this step, the media file may be a file such as music or a video. The client may be a mobile client such as a mobile phone. In some embodiments, the current network connection information of the client indicates whether the client has a wired or wireless connection to the server. For wireless connection, the connection information further indicates whether the connection is Wi-Fi or cellular network connection. Different types of network connection have different network transmission speeds, which may be used for determining the size of a fragment of a media file by the server.

Step S103: The server divides a media file into an ordered list of fragments according to the current network connection information of the client after receiving the request for acquiring the media file from the client, stores the fragments so as to form download list information of the fragments, and further sends the download list information of the fragments to the client.

In this step, a method of dividing the media file into several fragments may be a method of performing average division according to a file size of the media file, or any other dividing method. If the average dividing method is used, the method may be that: if a media file that is 128 MB is divided into two fragments, the file size of each fragment is 64 MB. As noted above, the server may use the current network connection information when fragmenting the media file. For example, if the network transmission speed is below a preset value, the server may divide the media file into more fragments of smaller size such that it is more likely for the client to download a complete fragment within a short time period when the client has connection to the server. If the network transmission speed exceeds a preset value, the server may divide the media file into fewer fragments of larger size such that it is more likely for the client to download a large, complete fragment within a predefined time period when the client has connection to the server.

The download list information of each of the fragments includes information such as a uniform/universal resource locator (URL) stored in the fragment.

Step S105: The client initiates a request for acquiring fragments of the media file to the server according to an order of the fragments in the download list information received from the server.

Step S107: The server returns the fragments of the media file to the client sequentially according to the request for acquiring the fragments of the media file received from the client.

In this step, the order of the fragments may be a chronological order of the fragments (i.e., a chronological order in which the media file is played). For example, a fragment in which a start location of the media file is located is the first fragment; the fragments are sequentially arranged according to a play chronological order; and other fragments are sequentially the second fragment, the third fragment, and the like.

Step S109: The client acquires the fragments of the media file returned by the server, and plays the fragments of the media file returned by the server in accordance with the order of the fragments according to a received instruction of playing the media file.

In this step, because the fragments are mutually independent, that is, the fragments may be independently played, fragments that are downloaded completely may also be independently played when other fragments are not downloaded completely.

In this embodiment of the present application and in the present disclosure, the server divides the media file into an ordered list of fragments according to the current network connection information of the client and stores the fragments so as to form the download list information of the fragments; and the client initiates a request for acquiring fragments of the media file to the server according to an order of the fragments in download list information, and plays the fragments of the media file according to the order of the fragments when receiving an instruction of playing the media file. Because an optimization downloading method of dividing the media file and a play method of playing the fragments are used, the downloading method is optimized. Moreover, the media file may also be played according to an order of the fragments. Even if when other fragments of the media file are not downloaded completely, the downloaded fragments may also be normally played. In this way, a user may play a part of the media file that is downloaded completely at any time, which achieves an objective of simply and quickly playing a media file that is not downloaded completely.

Figure 2:
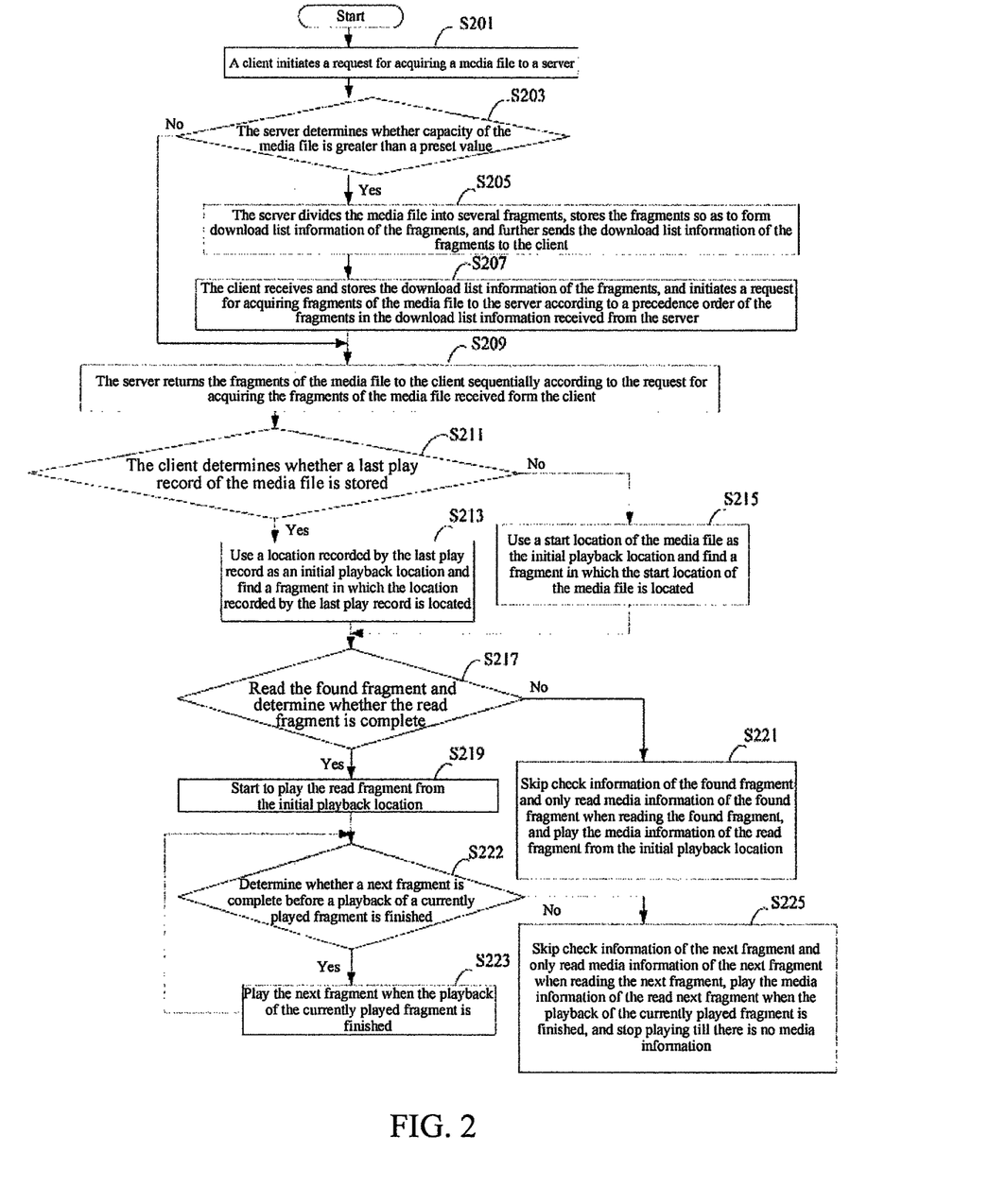
FIG. 2 is a flowchart of steps of a method for downloading and playing a media file according to another embodiment of the present application.

FIG. 2 is a flowchart of steps of a method for downloading and playing a media file according to another embodiment of the present application. FIG. 2 is an improvement on the basis of FIG. 1. Referring to FIG. 2, the method for downloading and playing a media file in this embodiment of the present application may include the following steps S201-S225:

Step S201: A client initiates a request for acquiring a media file to a server.

In this step, the media file may be a file such as music or a video. The client may be a mobile client such as a mobile phone.

Step S203: The server determines whether a file size of the media file is greater than a preset value, and executes step S205 if the file size of the media file is greater than the preset value, or uses the media file as one fragment and executes step S209 if the file size of the media file is not greater than the preset value.

In this step, the server may calculate a file size of the media file and determine whether the file size of the media file is greater than the preset value (for example, the preset value is a value such as 120 MB). The preset value may be set according to actual needs.

Step S205: The server divides the media file into an ordered list of fragments according to the current network connection information of the client, stores the fragments so as to form download list information of the fragments, and further sends the download list information of the fragments to the client.

In this step, a method of dividing the media file into the several fragments may be a method of performing average division according to a file size of the media file, or any other dividing method. If the average dividing method is used, the method may be that: if a media file that is 128 MB is divided into two fragments, the file size of each fragment is 64 MB.

The download list information of each of the fragments includes information such as a URL stored in the fragment.

Step S207: The client receives and stores the download list information of the fragments, and initiates a request for acquiring fragments of the media file to the server according to an order of the fragments in the download list information received from the server.

In this step, the order of the fragments may be a chronological order of the fragments (i.e., a chronological order in which the media file is played). For example, a fragment in which a start location of the media file is located is the first fragment; the fragments are sequentially arranged according to a play chronological order; and other fragments are sequentially the second fragment, the third fragment, and the like.

Step S209: The server returns the fragments of the media file to the client sequentially according to the request for acquiring the fragments of the media file received from the client.

If the file size of the media file acquired in S203 is less than the preset value, in this step, the server uses the media file as one fragment and returns the fragment (i.e., the media file) to the client, that is, the server returns the media file to the client.

Step S211: The client determines whether a last play record of the media file is stored after acquiring the fragments of the media file returned by the server and receiving an instruction of playing the media file, and executes step S213 if the last play record of the media file is stored, or executes step S215 if the last play record of the media file is not stored.

In this step, a memory of the client prestores the last play record, and the last play record may record playback location information such as a last play time, a last play progress, and till which fragment a media file is played for the last time. For example, the instruction of playing the media file is sent when the client opens the media file and chooses to play the media file.

Step S213: Determine to play the media file from a location recorded by the last play record of the media file, use the location recorded by the last play record as an initial playback location, identify a fragment including the location recorded by the last play record, and execute step S217.

Step S215: Determine to play the media file from the start location of the media file, use the start location of the media file as the initial playback location, find the fragment including the start location of the media file is located, and execute step S217.

In this step, the fragment including the start location of the media file is located is the first fragment.

Step S217: Read the identified fragment, determine whether the identified fragment is complete, and execute step S219 if the identified fragment is complete, or execute step S221 if the identified fragment is incomplete.

In this step, whether the identified fragment is complete may be determined by determining whether the identified fragment includes a terminator. Specifically, it is determined that the identified fragment is complete if the identified fragment includes a terminator, and it is determined that the identified fragment is incomplete if the identified fragment does not include a terminator.

Step S219: Start to play the identified fragment from the initial playback location and execute step S222.

In this step, the identified fragment is played from a playback location recorded by the last play record of the fragment if the initial playback location is the location recorded by the last play record. The read fragment is played from the start location of the media file if the initial playback location is the start location of the media file.

Step S221: Skip check information of the identified fragment and only read media content of the identified fragment when reading the identified fragment, play the media content of the identified fragment from the initial playback location, and stop playing till there is no media information.

In this step, the check information may be stored in a file header of the fragment. Check information of the file header may include information such as time information of the fragment and a file size of the fragment. For example, the time information of the fragment in the check information may be displayed on a playback interface to be viewed by a user. If the fragment is incomplete, the check information of the file header of the fragment is generally also incomplete. The media information of the fragment is media data that may be played. An initial playback location of the media content of the identified fragment is the initial playback location of the media file. That is, the identified fragment is played from a playback location recorded by the last play record of the fragment if the initial playback location is the location recorded by the last play record. The read fragment is played from the start location of the media file if the initial playback location is the start location of the media file.

Step S222: Find a next fragment before playback of a currently played fragment is finished, determine whether the next fragment is complete, and execute step S223 if the next fragment is complete, or execute step S225 if the next fragment is incomplete.

In this step, the currently played fragment is a fragment that is being played. In a period of time (for example, 10 minutes) before the playback of the currently played fragment is finished, the next fragment is found and read, and it is determined whether the next fragment is complete. How to play the fragment in conditions in which the fragment is complete and the fragment is incomplete is set, so as to get ready for preparatory work of playing the next fragment in advance, which is mainly used for ensuring fluency of the playback.

Step S223: Play the next fragment when the playback of the currently played fragment is finished, and execute step S222.

Step S225: Skip check information of the next fragment and only read media content of the next fragment when reading the next fragment, play the media content of the next fragment when the playback of the currently played fragment is finished, and stop playing till there is no media information.

In this step, the check information may be stored in a file header of the fragment.

In this embodiment of the present application and in the present disclosure, the server divides the media file into an ordered list of fragments according to the current network connection information of the client and stores the fragments so as to form the download list information of the fragments; and the client initiates a request for acquiring fragments of the media file to the server according to an order of the fragments in download list information, and plays the fragments of the media file according to the order of the fragments when receiving an instruction of playing the media file. Moreover, whether a last play record of the media file is stored in a memory is determined. The location recorded by the last play record is used as an initial playback location, and a fragment including the location recorded by the last play record in the download list information is found if the last play record of the media file is stored; or the start location of the media file is used as the initial playback location, and the fragment including the start location of the media file is located is found if the last play record of the media file is not stored. The identified fragment is read, and whether the identified fragment is complete is determined. The read fragment starts to be played from the initial playback location if the identified fragment is complete. The media content of the identified fragment is played from the initial playback location if the identified fragment is incomplete. Because an optimization downloading method of dividing the media file and a play method of playing the downloaded complete and incomplete fragments are used, the downloading method is optimized. Moreover, the media file may also be played according to an order of the fragments. Even if when other fragments of the media file are not downloaded completely, the downloaded complete and downloaded incomplete fragments may also be normally played. In this way, a user may play a part of the media file that is downloaded completely at any time, which achieves an objective of simply and quickly playing a media file that is not downloaded completely. Moreover, after playback of a currently played fragment is finished, a next fragment can further be fluently played, and unstable phenomena such as a stop and intermission during the playback do not arise, thereby ensuring excellent feelings of the user during entertainment, improving a playback quality of the media file, and improving user playback experiences of the media file.

Figure 3:
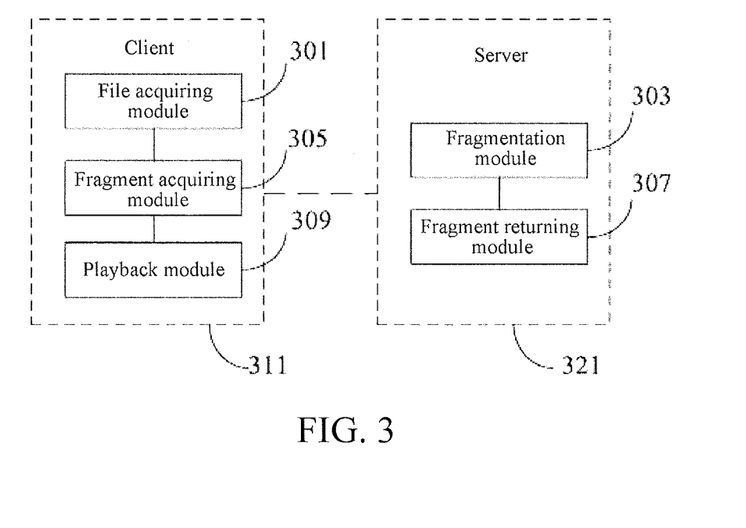
FIG. 3 is a block diagram of main architecture of a system for downloading and playing a media file according to an embodiment of the present application.

FIG. 3 is a block diagram of main architecture of a system for downloading and playing a media file according to an embodiment of the present application.

Referring to FIG. 3, this embodiment of the present application provides a client 311. The client 311 includes one or more processors, memory and a plurality of program modules stored in the memory and to be executed by the one or more processors, the plurality of program modules further including:

a file acquiring module 301, configured to initiate a request for acquiring a media file to a server, the request including current network connection information of the client, and receive download list information from the server, wherein the download list information identifies an ordered list of fragments extracted from the media file by the server in accordance with the current network connection information of the client;

a fragment acquiring module 305, configured to initiate a request for acquiring the fragments of the media file to the server according to the order of the fragments in the download list information, and acquire the fragments of the media file returned by the server; and a playback module 309, configured to play the fragments of the media file returned by the server in accordance with the order of the fragments according to a received instruction of playing the media file.

The playback module 309 is further configured to:

determine whether a last play record of the media file is stored;

determine that a location recorded by the last play record is an initial playback location and identify a fragment including the location recorded by the last play record in the download list information if the last play record of the media file is stored;

determine that a start location of the media file is the initial playback location and identify a fragment including the start location of the media file in the download list information if the last play record of the media file is not stored; and determine whether the identified fragment is complete; and start to play the identified fragment from the initial playback location if it is determined that the identified fragment is complete.

The playback module 309 is further configured to skip check information of the identified fragment, only read media content of the identified fragment when reading the identified fragment, and play the media content of the identified fragment from the initial playback location if it is determined that the identified fragment is incomplete after determining whether the identified fragment is complete.

The playback module 309 is further configured to: after receiving an instruction of playing the media file, identify a next fragment before playback of a currently played fragment is finished, and determine whether the next fragment is complete;

play the next fragment when the playback of the currently played fragment is finished if it is determined that the next fragment is complete; or skip check information of the next fragment, only read media content of the next fragment when reading the next fragment, and play the media content of the next fragment when the playback of the currently played fragment is finished if it is determined that the next fragment is incomplete.

This embodiment of the present application further provides a server 321. The server 321 includes one or more processors, memory and a plurality of program modules stored in the memory and to be executed by the one or more processors, the plurality of program modules further including:

a fragmentation module 303, configured to divide a media file into an ordered list of fragments according to the current network connection information of the client after receiving a request for acquiring the media file from a client, store the fragments so as to form download list information of the fragments, and further send the download list information of the fragments to the client; and a fragment returning module 307, configured to return the fragments of the media file to the client sequentially according to a request for acquiring the fragments of the media file received from the client.

The fragmentation module 303 is further configured to:

determine whether file size of the media file is greater than a preset value;

divide the media file into the several fragments if the file size of the media file is greater than the preset value; or use the media file as one fragment and return the fragment to the client if the file size of the media file is not greater than the preset value.

Referring to FIG. 3, the system for downloading and playing a media file includes a client 311 and a server 321. The client 311 further includes a file acquiring module 301, a fragment acquiring module 305, and a playback module 309. The server 321 includes a fragmentation module 303 and a fragment returning module 307.

Specifically, the file acquiring module 301 that may be set in the client is configured to initiate a request for acquiring a media file to a server, the request including current network connection information of the client. The media file may be a file such as music or a video.

The fragment dividing module 303 that may be set in the server is configured to divide the media file into an ordered list of fragments according to the current network connection information of the client after receiving the request for acquiring the media file from the client, store the fragments so as to form download list information of the fragments, and further send the download list information of the fragments to the client.

Moreover, the fragmentation module 303 is further configured to determine whether file size of the media file is greater than a preset value; divide the media file into the several fragments if the file size of the media file is greater than the preset value; or use the media file as one fragment and return the fragment to the client if the file size of the media file is not greater than the preset value.

The segment acquiring module 305 that may be set in the client is configured to initiate a request for acquiring the fragments of the media file to the server according to an order of the fragments in download list information received from the server, and acquire the fragments of the media file returned by the server.

The fragment returning module 307 that may be set in the server is configured to return the fragments of the media file to the client sequentially according to the request for acquiring the fragments of the media file received from the client.

The playback module 309 that may be set in the client is configured to play the fragments of the media file returned by the server in accordance with the order of the fragments according to a received instruction of playing the media file.

Moreover, the playback module 309 is further configured to determine whether a last play record of the media file is stored in a memory; determine to play the media file from a location recorded by the last play record of the media file, use the location recorded by the last play record as an initial playback location, and identify a fragment including the location recorded by the last play record in the download list information if the last play record of the media file is stored; or determine to play the media file from the start location of the media file, use the start location of the media file as the initial playback location, and find the fragment including the start location of the media file is located if the last play record of the media file is not stored; read the identified fragment, and determine whether the identified fragment is complete; and start to play the identified fragment from the initial playback location if the identified fragment is complete.

Moreover, the playback module 309 is further configured to skip check information of the identified fragment and only read media content of the identified fragment when reading the identified fragment, and play the media content of the identified fragment from the initial playback location if it is determined that the identified fragment is incomplete.

Moreover, the playback module 309 is further configured to identify a next fragment before playback of a currently played fragment is finished, and determine whether the next fragment is complete; play the next fragment when the playback of the currently played fragment is finished if the next fragment is complete; or skip check information of the next fragment, only read media content of the next fragment when reading the next fragment, and play the media content of the next fragment when the playback of the currently played fragment is finished if the next fragment is incomplete.

In this embodiment of the present application and in the present disclosure, the server divides the media file into an ordered list of fragments according to the current network connection information of the client and stores the fragments so as to form the download list information of the fragments; and the client initiates a request for acquiring fragments of the media file to the server according to an order of the fragments in download list information, and plays the fragments of the media file according to the order of the fragments when receiving an instruction of playing the media file. Moreover, whether a last play record of the media file is stored in a memory is determined. The location recorded by the last play record is used as an initial playback location, and a fragment including the location recorded by the last play record in the download list information is found if the last play record of the media file is stored; or the start location of the media file is used as the initial playback location, and the fragment including the start location of the media file is located is found if the last play record of the media file is not stored. The identified fragment is read, and whether the identified fragment is complete is determined. The read fragment starts to be played from the initial playback location if the identified fragment is complete. The media content of the identified fragment is played from the initial playback location if the identified fragment is incomplete. Because an optimization downloading method of dividing the media file and a play method of playing the downloaded complete and incomplete fragments are used, the downloading method is optimized. Moreover, the media file may also be played according to an order of the fragments. Even if when other fragments of the media file are not downloaded completely, the downloaded complete and downloaded incomplete fragments may also be normally played. In this way, a user may play a part of the media file that is downloaded completely at any time, which achieves an objective of simply and quickly playing a media file that is not downloaded completely. Moreover, after playback of a currently played fragment is finished, a next fragment can further be fluently played, and unstable phenomena such as a stop and intermission during the playback do not arise, thereby ensuring excellent feelings of users during entertainment, improving a playback quality of the media file, and improving user playback experiences of the media file.

A person of ordinary skill in the art may understand that all or some of the processes of the methods in the foregoing embodiments may be implemented by a computer program controlling relevant hardware. The program may be stored in a computer readable storage medium. During the execution of the program, processes of the foregoing method embodiments may be included. The storage medium may be a magnetic disk, an optical disc, a read-only memory (ROM), a random access memory (RAM) or the like.

Therefore, the embodiments of the present application further provide one or more storage media containing a computer executable instruction, the computer executable instruction being used for executing a method running on a client for downloading and playing a media file, and the method including the following steps:

initiating a request for acquiring a media file to a server, the request including current network connection information of the client;

receiving download list information from the server, wherein the download list information identifies an ordered list of fragments extracted from the media file by the server in accordance with the current network connection information of the client;

initiating a request for acquiring the fragments of the media file to the server according to the order of the fragments in the download list information, and acquiring the fragments of the media file returned by the server; and playing the fragments of the media file returned by the server in accordance with the order of the fragments according to a received instruction of playing the media file.

The embodiments of the present application further provide another one or more storage media containing a computer executable instruction, the computer executable instruction being used for executing a method running on a server for downloading and playing a media file, and the method including the following steps:

dividing the media file into an ordered list of fragments according to the current network connection information of the client after receiving a request for acquiring the media file from a client, storing the fragments so as to form download list information of the fragments, and further sending the download list information of the fragments to the client; and returning the fragments of the media file to the client sequentially according to a request for acquiring the fragments of the media file received from the client.

The above descriptions are merely preferred embodiments of the present application, and are not intended to limit the present application in any form. Although the present application has been disclosed above through the preferred embodiments, the embodiments are not intended to limit the present application. A person skilled in the art can make some equivalent variations, alterations or modifications to the above-disclosed technical content without departing from the scope of the technical solutions of the present application to obtain equivalent embodiments. Any simple alteration, equivalent change or modification made to the above embodiments according to the technical essence of the present application without departing from the content of the technical solutions of the present application shall fall within the scope of the technical solutions of the present application.

What is claimed is:

1. A method for downloading and playing a media file, comprising:

at a client device having one or more processors and memory storing program modules to be executed by the one or more processors:
    sending a request for acquiring the media file to a server, the request including current network connection information of the client device, wherein the server is configured to determine whether a file size of the media file is greater than a preset value, and dynamically divide the media file into an ordered list of fragments in accordance with the current network connection information of the client device when the file size of the media file is greater than the preset value;
    receiving download list information from the server, wherein the download list information identifies the ordered list of fragments;
    after receiving the download list information from the server, initiating a request for acquiring the fragments of the media file to the server according to the order of the fragments in the download list information, and acquiring the fragments of the media file returned by the server;
    playing the fragments of the media file returned by the server in accordance with the order of the fragments according to a received instruction of playing the media file;
    after receiving the instruction of playing the media file:
        identifying a next fragment before playback of a currently played fragment is finished and determining whether the next fragment is complete;
        in accordance with a determination that the next fragment is complete, playing the next fragment when the playback of the currently played fragment is finished; and
        in accordance with a determination that the next fragment is incomplete, skipping check information of the next fragment and only reading media content of the next fragment when reading the next fragment, and playing the media content of the next fragment when the playback of the currently played fragment is finished.

2. The method according to claim 1, further comprising:
after receiving the instruction of playing the media file:
determining whether a last play record of the media file is stored;
determining to use a location recorded by the last play record as an initial playback location and identifying a first fragment including the location recorded by the last play record in the download list information if the last play record of the media file is stored;
determining to use a start location of the media file as the initial playback location and identifying the first fragment including the start location of the media file in the download list information if the last play record of the media file is not stored;
determining whether the first fragment is complete; and
in accordance with a determination that the first fragment is complete, starting to play the first fragment from the initial playback location.

3. The method according to claim 2, further comprising:
after determining whether the first fragment is complete:
in accordance with a determination that the first fragment is incomplete, skipping check information of the first fragment and only reading media content of the identified fragment when reading the first fragment, and playing the media content of the first fragment from the initial playback location.

4. The method according to claim 1, wherein the next fragment is immediately after the currently played fragment.

5. The method according to claim 1, wherein sizes of the fragments of the media file are dynamically determined by the current network connection information of the client device.

6. A method for downloading a media file, comprising:
at a server having one or more processors and memory storing program modules to be executed by the one or more processors:
  receiving a request for acquiring the media file from a client device, the request including current network connection information of the client device;
  after receiving the request for acquiring the media file, determining whether a file size of the media file is greater than a preset value;
  in accordance with a determination that the file size of the media file is greater than the preset value, dynamically dividing the media file into an ordered list of fragments according to the current network connection information of the client device, storing the fragments in the memory, forming download list information of the fragments, and further sending the download list information of the fragments to the client device;
  after sending the download list information of the fragments, receiving a request for acquiring the fragments of the media file from the client device; and
  in response to the request for acquiring the fragments of the media file, returning the fragments of the media file to the client device sequentially according to the order of the fragments in the download list information,
  wherein the client device is configured to play the fragments of the media file returned by the server in accordance with the order of the fragments according to a received instruction of playing the media file, and after receiving the instruction of playing the media file, identify a next fragment before playback of a currently played fragment is finished and determining whether the next fragment is complete;
  in accordance with a determination that the next fragment is complete, play the next fragment when the playback of the currently played fragment is finished; and
  in accordance with a determination that the next fragment is incomplete, skip check information of the next fragment and only reading media content of the next fragment when reading the next fragment, and playing the media content of the next fragment when the playback of the currently played fragment is finished.

7. A client device, comprising:
one or more processors;
memory; and
a plurality of program modules, wherein the plurality of program modules, when executed by the one or more processors, cause the client device to perform pre-defined operations, the plurality of program modules further including:
  a file acquiring module, configured to send a request for acquiring a media file to a server, the request including current network connection information of the client device, wherein the server is configured to determine whether a file size of the media file is greater than a preset value, and dynamically divide the media file into an ordered list of fragments in accordance with the current network connection information of the client device when the file size of the media file is greater than the preset value, and receive download list information from the server, wherein the download list information identifies the ordered list of fragments;
  a fragment acquiring module, configured to after receiving the download list information from the server, initiate a request for acquiring the fragments of the media file to the server according to the order of the fragments in the download list information, and acquire the fragments of the media file returned by the server; and
  a playback module, configured to play the fragments of the media file returned by the server in accordance with the order of the fragments according to a received instruction of playing the media file and after receiving the instruction of playing the media file, identify a next fragment before playback of a currently played fragment is finished and determining whether the next fragment is complete;
  in accordance with a determination that the next fragment is complete, playing the next fragment when the playback of the currently played fragment is finished; and
  in accordance with a determination that the next fragment is incomplete, skipping check information of the next fragment and only reading media content of the next fragment when reading the next fragment, and playing the media content of the next fragment when the playback of the currently played fragment is finished.

8. The client device according to claim 7, wherein the playback module is further configured to:
  determine whether a last play record of the media file is stored;
  determine that a location recorded by the last play record is an initial playback location and identify a first fragment including the location recorded by the last play record in the download list information if the last play record of the media file is stored;
  determine that a start location of the media file is the initial playback location and identify the first fragment including the start location of the media file in the download list information if the last play record of the media file is not stored;
  determine whether the first fragment is complete; and
  in accordance with a determination that the first fragment is complete, start to play the first fragment from the initial playback location.

9. The client device according to claim 8, wherein the playback module is further configured to:
  after determining whether the first fragment is complete and in accordance with a determination that the first fragment is incomplete, skip check information of the first fragment and only read media content of the identified fragment when reading the first fragment, and play the media content of the identified fragment from the initial playback location.

10. The client device according to claim 7, wherein the next fragment is immediately after the currently played fragment.

11. The client device according to claim 7, wherein sizes of the fragments of the media file are dynamically determined by the current network connection information of the client device.

* * * * *